(12) United States Patent
Tong

(10) Patent No.: US 6,566,785 B1
(45) Date of Patent: May 20, 2003

(54) RETAINING RING LOCKING KEY GROOVE

(75) Inventor: Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 175 days.

(21) Appl. No.: 09/606,937

(22) Filed: Jun. 29, 2000

(51) Int. Cl.⁷ ................................................. H02K 3/46
(52) U.S. Cl. ........................................ 310/270; 310/271
(58) Field of Search ............................. 310/270, 271, 310/260

(56) References Cited

U.S. PATENT DOCUMENTS

| | | | | |
|---|---|---|---|---|
| 4,316,114 A | * | 2/1982 | Zagorodnaya et al. | 310/270 |
| 5,113,114 A | * | 5/1992 | Shih et al. | 310/270 |
| 5,174,001 A | * | 12/1992 | Shirai et al. | 29/27 B |
| 5,174,011 A | * | 12/1992 | Weigelt | 310/270 |
| 5,358,432 A | * | 10/1994 | Shih et al. | 439/825 |
| 5,861,698 A | * | 1/1999 | Murphy | 310/214 |
| 6,285,110 B1 | * | 9/2001 | Tong et al. | 310/270 |

* cited by examiner

Primary Examiner—Nestor Ramirez
Assistant Examiner—Karen Addison
(74) Attorney, Agent, or Firm—Nixon & Vanderhye P.C.

(57) ABSTRACT

A retaining ring for a rotor assembly has inboard and outboard ends. Each of the inboard and outboard ends is formed with a locking key groove open in a radially inward direction, each groove having a base representing a maximum depth of the groove, and a pair of side walls, the base having at least one flat portion therealong. In one embodiment, the groove base is defined by a pair of quarter circles connected by respective flat portions, the slots themselves separated by a raised platform. In a second embodiment, the raised platform is eliminated in favor of a flat base extending between radiused curves at the corners of the groove. In the latter embodiment, a locking ring is employed that has corner radii less than the radii of the curves in the corners of the groove.

8 Claims, 4 Drawing Sheets

RETAINING RING LOCKING KEY GROOVE

The present invention relates to rotary electric machines such as turbine generators and, more particularly to locking key grooves in a rotor retaining ring for reducing maximum stress acting on the retaining ring.

BACKGROUND OF THE INVENTION

A retaining ring is one of the most highly stressed and thus critical components present in a rotary electric machine such as turbine generator, motors or condenser. The main function of the retaining ring is to retain the field winding extending beyond each end of the rotor body against centrifugal forces acting upon the winding. For a rotor body mounted retaining ring, which is the most prevalent retaining ring design, the retaining ring is shrunk on, and keyed in place to, a portion of the rotor body at the inboard end of the ring, and to a centering ring at the outboard end of the ring. These fitments at the inboard and outboard ends of the retaining ring must be designed with sufficient interference to keep them tight up to 120% of rated speed. This forces the retaining ring to remain cylindrical and prevents differential movement in the tangential direction of the ring with respect to the rotor body. However, the maximum permissible interference is limited by the stresses introduced in the components and the temperatures required assembling or disassembling the rings. The locking keys are used at opposite ends of the retaining ring to take thrust loads and prevent relative axial motion between the rotor and the retaining ring.

Retaining ring stresses arise from: (1) the centrifugal forces generated by the payload; (2) the mass of the retaining ring itself; (3) the shrink fit made during assembly; and (4) the thrust loads acting on the sides of the locking key grooves. During normal operation, the centrifugal load of the end winding contributes 5,000 to 8,000 pounds for each pound of copper under the ring. This produces a high hoop stress, which, for two-pole rotors, attempts to stretch the ring into a slightly elliptical shape. The stress due to the retaining ring mass is approximately proportional to the square of the ring diameter and the material density. The axial forces result from the radial expansions of the retaining ring and rotor at a high rotating speed, and differential thermal expansion between the retaining ring and winding. The axial load acting on a locking key could range from 200,000 to 1,000,000 pounds, depending on the machine rating and size. In order to sustain such high loads and to minimize energy loss in retaining rings, a nonmagnetic, high-strength stainless steel (e.g., 18Mn-18Cr) has been selected as the retaining ring material by the assignee since the mid-1980s.

Current locking key grooves are machined at the opposite ends of the retaining ring, facing radially inwardly. Conventionally, two half-circle slots, with equal radii, are machined at the corners at the base of the groove to prevent possible interference between the locking key and the retaining ring (see FIG. 2). A small platform formed in the base, between the two half-circles, is used to sustain the radial load from the locking key during normal operation. An analysis has revealed that maximum stress in a retaining ring is very sensitive to the radii of these half-circle slots. During normal operation, and as mentioned above, the locking key is used to sustain the axial thrust load from the retaining ring and to prevent relative axial motion to the rotor.

As a highly localized effect, stress concentration is usually introduced by an abrupt change in shape of a member, for example, notches and holes. For retaining rings, stress concentration regions usually occur at the bottom or base of the locking key groove, and more particularly, near the half-circle slots due to geometric discontinuity.

BRIEF SUMMARY OF THE INVENTION

Redesign of the locking key grooves can alter the stress distribution in the retaining ring and thus improve stress concentration near the half-circle slots. Two alternative designs are proposed herein. In a first embodiment, the groove height (i.e., depth) and width remain the same as in the conventional design, but each corner slot is made by a set of curves, consisting of two quarter-circles and a short straight line between them. A flat but radially offset platform remains in the bottom or base of the groove, between the two slots.

In a second embodiment, the individual slots and the small platform are completely removed from the bottom or base of the groove. In this design, the reduction of maximum stress is achieved from both the improved structure continuity and increased effective retaining ring thickness. It is found that up to 18% of the effective retaining ring thickness can be increased without changing the groove height and width. To prevent the interference between the locking key and the groove, the radii at the corners of the key radius must be larger than the radii at the bottom or base corners of the groove.

Accordingly, in its broader aspects, the invention relates to a retaining ring for a rotor assembly, comprising a ring body having inboard and outboard ends, each of the inboard and outboard ends having a locking key groove open in a radially inward direction, each locking key groove having a base and a pair of side walls, the base having at least one flat portion therealong representing a maximum depth of the groove.

DETAILED DESCRIPTION OF THE INVENTION

Figure 1:
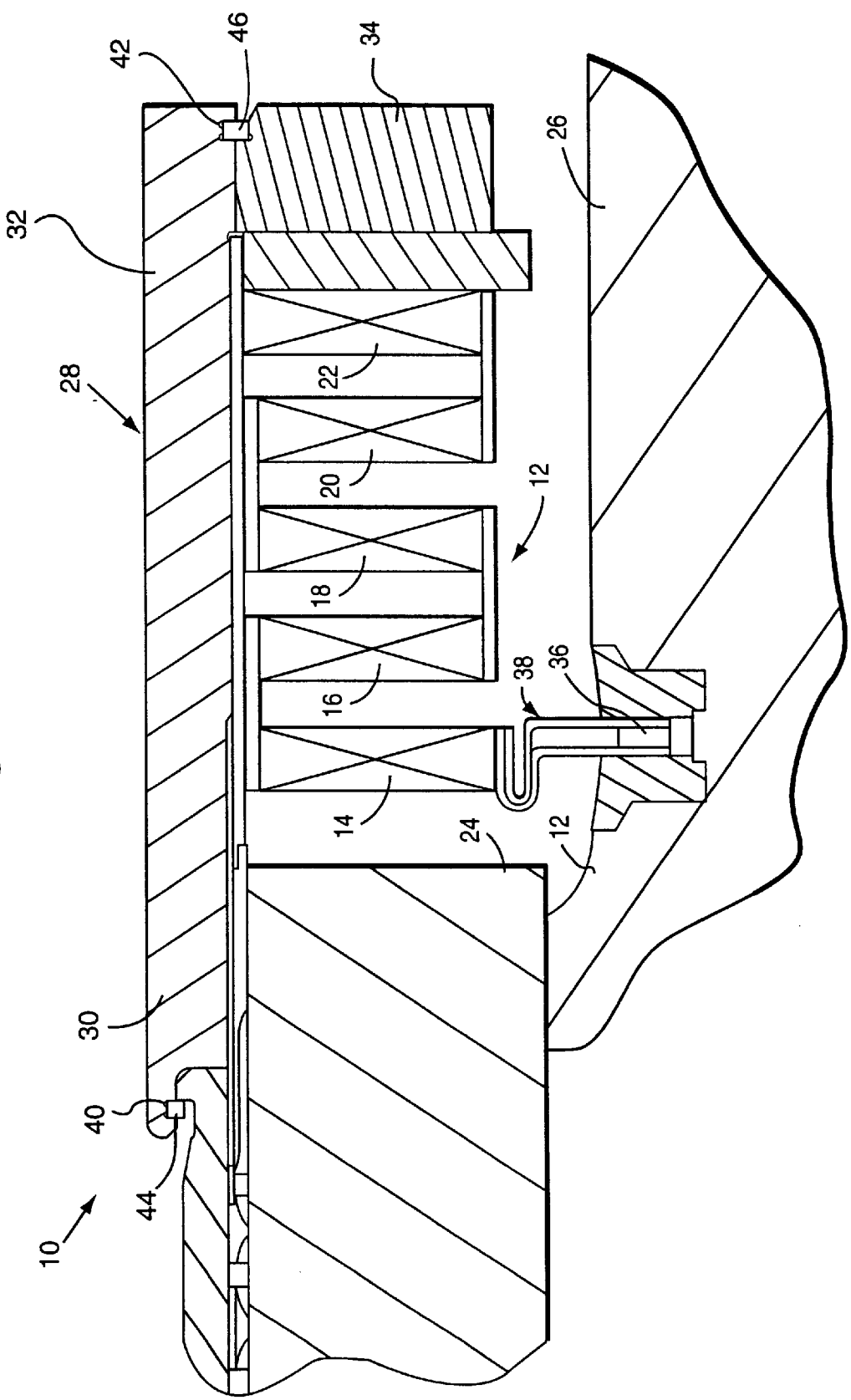
FIG. 1 is a partial side section of one end of a turbine rotor, illustrating the assembly of the retaining ring and rotor end winding.

With reference to FIG. 1, one end of a rotor body 10 is illustrated with a field winding end turn 12 extending beyond the end of the rotor body. The field winding end turn include the ends of a number of complete coils or windings 14, 16, 18, 20 and 22 that are arranged in a concentric, generally rectangular configuration. For a two-pole rotor, two such concentric sets of field coils or windings are arranged on opposite sides of the rotor. The invention is applicable, however, to other rotor configurations as well. Each coil or winding includes many layers of copper conductors in a stacked configuration. The invention can be applied to coils made up of multiple layers of discrete conductors, as well as single wound conductors. The coils are nested within axially extending radial slots (not shown) machined into the outer periphery of the rotor body, with the end turns extending axially beyond an edge 24 of the rotor body at both ends of the machine in conventional fashion. A spindle portion 26 of the rotor extends further in the axial direction but radially inward of the end turns. The coils 14, 16, 18, 20 and 22 are supported in the slots of the rotor body against centrifugal forces by metallic wedges (not shown) which bear against machined dovetail surfaces (also not shown) in each rotor coil slot.

The end turns are supported against centrifugal forces by a high strength, annular steel retaining rings 28 (one shown) at opposite ends of the rotor. The inboard end 30 of each retaining ring is shrunk onto a machined surface of the rotor body, while the outboard end 32 of the retaining ring 28 is shrunk onto a circular shaped steel member or centering ring 34. The field winding is electrically insulated from the rotor body and retaining ring via appropriate ground insulation (not shown). Electrical connection with a copper bore conductor 36 is made via connector 38.

Figure 2:
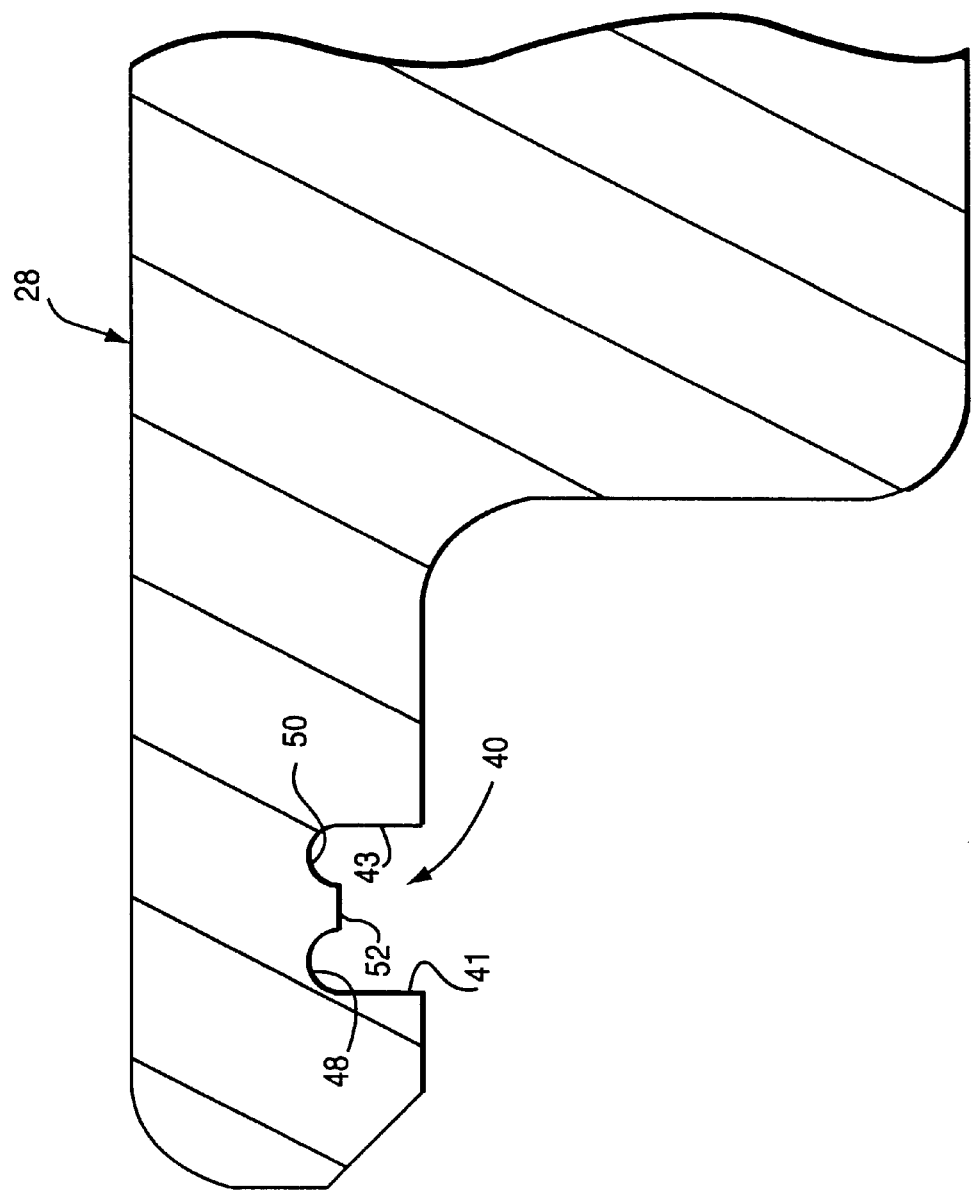
FIG. 2 is an enlarged partial cross section of a conventional locking key groove in a retaining ring.

The retaining ring 28 is formed with radially and inwardly facing locking key grooves 40, 42 that receive locking key rings 44, 46, respectively. Since the grooves 40 and 42 are identical, only one need be described in detail. FIG. 2 illustrates the known groove 40 in enlarged form. The groove 40 includes side walls 41, 43 and a bottom or base formed by two half circle slots 48, 50 (having equal radii) machined at the corners of the bottom or base of the groove 40. There is a small axial platform 52 between the slots 48, 50 that is used to sustain the radial load from the locking key 44 (not shown in FIG. 2) during normal operation. The platform 52 is radially offset from the bottom of the groove, i.e., it projects away from the bottom of the groove. The slots 48, 50 per se prevent interference between the locking key 44 and the retaining ring 28. As already mentioned above, stress concentration regions usually occur at the bottom of the locking key groove, and more particularly, near the half circle slots 48, 50 due to geometric discontinuity.

Figure 3:
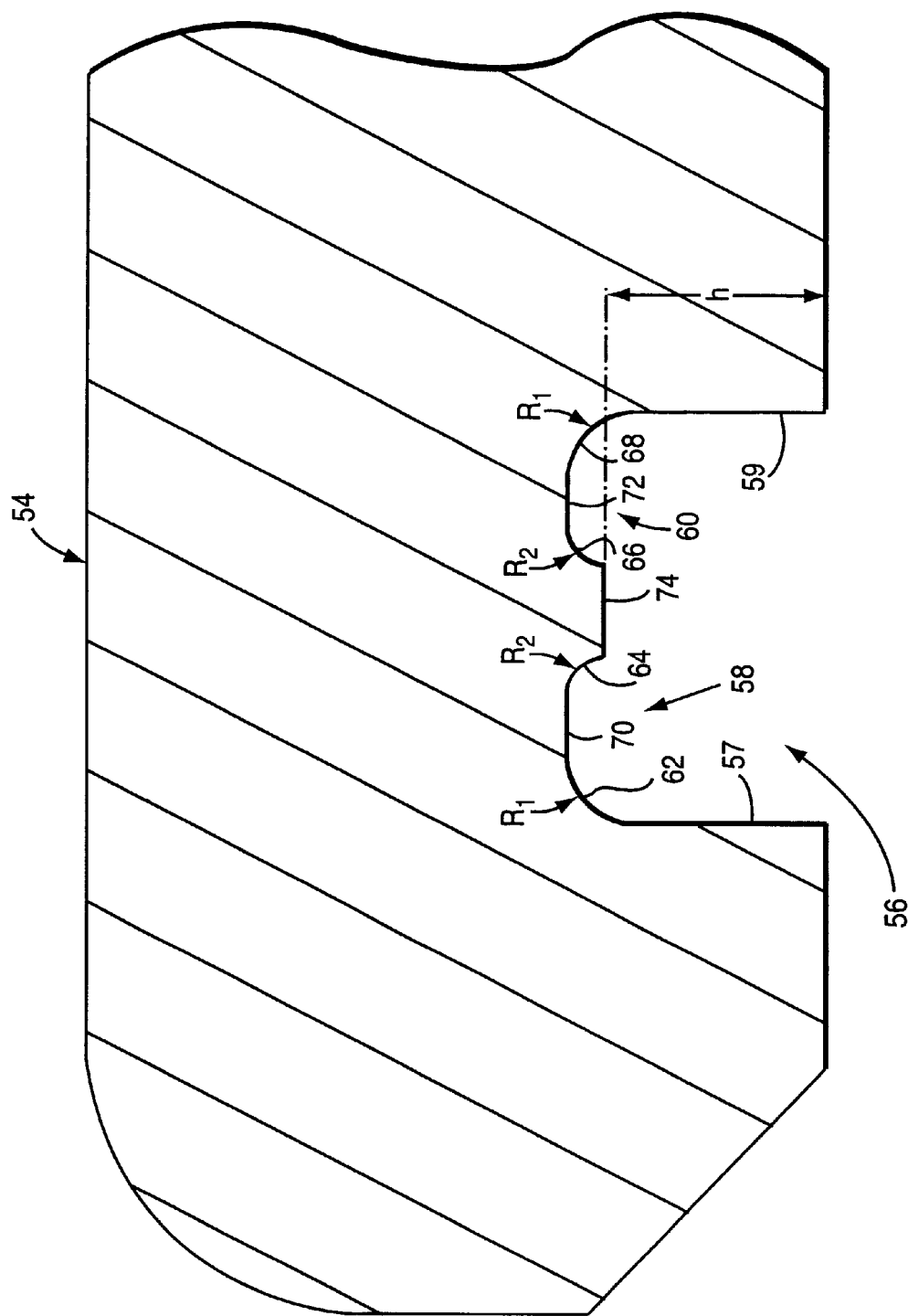
FIG. 3 is a partial cross section of a retaining ring provided with a locking key groove in accordance with a first exemplary embodiment of the invention.

With reference now to FIG. 3, a redesigned retaining ring locking key groove in accordance with a first exemplary embodiment of the invention is illustrated. In this embodiment, a locking key groove 56 in the retaining ring 54 has side walls 57, 59 and a bottom or base formed by slots 58, 60 and an intermediate platform 74. Slots 58, 60 are made by a pair of curves, consisting of two quarter circles 62, 64 and 66, 68, respectively, with flat axial length portions 70, 72 between them. The flat axial length portions 70, 72 thus represent the maximum depth of the groove. The quarter circles 62, 68 remote from the center platform 74 each have a radius $R_1$ that is greater than the radius $R_2$ of each of the quarter circles 64, 66 nearest the center platform 74. Since the radii of the quarter circles near the groove center have less impact on maximum stress, $R_2$ may be set at one third to one half $R_1$. In this way, the effective cross sectional thickness of the retaining ring groove (dimension h) can be increased by about 10%.

Figure 4:
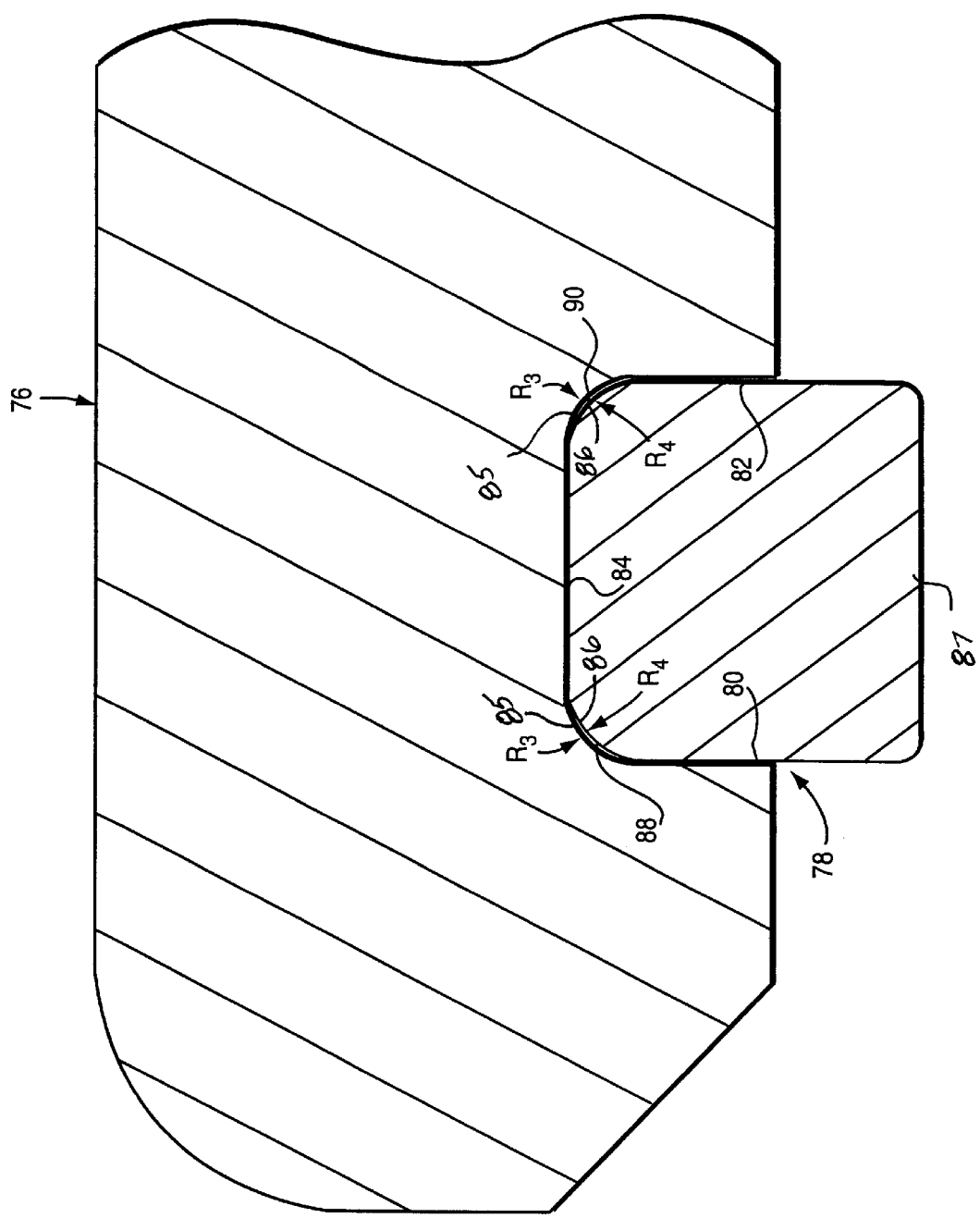
FIG. 4 is a partial cross section of a retaining ring illustrating a locking key groove in accordance with a second exemplary embodiment of the invention.

In a second embodiment illustrated in FIG. 4, the retaining ring 76 is machined to include a locking key groove 78 having side walls 80, 82 and a flat bottom or base 84. This design eliminates the center platform (see 74 in FIG. 3). In this embodiment, the bottom or base 84 of the groove is formed with corners 85 each defined by a curve with a radius $R_3$. The radius $R_3$ is smaller than a corresponding radius $R_4$ at the corresponding corner edges 86 of the locking key 87. This creates gaps 88, 90 in the corners of the groove, which prevent interference between the locking key 80 and the retaining ring 76.

A finite element analysis for the retaining ring locking key grooves 56 and 78 illustrated in FIGS. 3 and 4 shows that for a locking key groove 56 (FIG. 3) where $R_2$ is equal to one half $R_1$, the maximum hoop, axial and radial stresses are reduced by 3.5%, 18.4%, and 3.3%, respectively. With the elimination of the center platform all together as illustrated in FIG. 4, up to 32% of the maximum axial stress, 6% of the maximum hoop stress, and 14% of the maximum radial stresses may be eliminated.

The table below shows the results of the finite element analysis for the conventional ring groove shown in FIG. 2, and for the new ring groove designs shown in FIGS. 3 and 4, where $R_1$=0.06"; $R_2$=0.03"; and $R_3$=0.06".

| Locking Key Groove Design | Maximum Hoop Stress (ksi) | Maximum Axial Stress (ksi) | Maximum Radial Stress (ksi) | Note |
|---|---|---|---|---|
| Conventional Design (FIG. 2) | 100.99 (—) | 99.31 (—) | 74.67 (—) | R = 0.06" |
| New Design (FIG. 3) | 97.57 (−3.5%) | 83.90 (−18.4%) | 72.26 (−3.3%) | $R_1$ = 0.06" $R_2$ = 0.03" |
| New Design (FIG. 4) | 95.34 (−5.9%) | 75.47 (−31.6%) | 65.28 (−14.4%) | $R_3$ = 0.06" |

It will be appreciated that the locking key grooves 56 and 78 as shown in FIGS. 3 and 4 are to be used at both the inboard and outboard ends of the retaining ring. In addition, the data provided above is not to be considered as limiting the scope of this invention to locking key grooves having the specifically indicated radii. The dimensions of the locking key grooves are determined by a number of factors including rotor size, retaining ring size, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A retaining ring for a rotor assembly, comprising a ring body having inboard and outboard ends adapted for engagement, respectively, with a rotor body and a centering ring, each of said inboard and outboard ends having an annular locking key groove open in a radially inward direction, each locking key groove having a base and a pair of side walls, said base having at least one flat portion therealong representing a maximum depth of the groove; wherein said base of said groove is interrupted by an intermediate platform having a depth less than said maximum depth.

2. A retaining ring for a rotor assembly, comprising a ring body having inboard and outboard ends adapted for engagement, respectively, with a rotor body and a centering ring, each of said inboard and outboard ends having a locking key groove open in a radially inward direction, each locking key groove having a base and a pair of side walls, said base having a raised center platform and a pair of slots on either side of said center platform, each slot defined by a pair of quarter circles connected by a flat portion.

3. The retaining ring of claim 2 wherein the pair of quarter circles for each slot have different radii.

4. A retaining ring and locking key for a rotor assembly, comprising a ring body having inboard and outboard ends adapted for engagement, respectively, with a rotor body and a centering ring, each of said inboard and outboard ends having an annular locking key groove open in a radially inward direction, each locking key groove having a base representing a maximum depth of the groove, and a pair of side walls, said base having a flat portion extending between opposite corners where said base intersects said side walls, said corners each defined by curves having a first radius; the locking key having corner edges with a radii greater than said first radius in each of said corners of said locking key groove.

5. The retaining ring of claim 4 wherein said corners each have a radius of about 0.06 inch.

6. A retaining ring for a rotor assembly, comprising a ring body having inboard and outboard ends, each of said inboard and outboard ends having a locking key groove open in a radially inward direction, each locking key groove having a base and a pair of side walls, said base having at least one flat portion therealong representing a maximum depth of the groove; wherein said base includes a pair of slots, each defined by a pair of quarter circles connected by a flat portion; and wherein said base of said groove is interrupted by an intermediate platform having a depth less than said maximum depth; and wherein the quarter circles adjacent the side walls have a radius $R_1$, that is about 2× a radius $R_2$ of the quarter circles adjacent said intermediate platform.

7. The retaining ring of claim 6 wherein $R_1$ is about 0.06 inch and $R_2$ is about 0.03 inch.

8. A retaining ring for a rotor assembly, comprising a ring body having inboard and outboard ends adapted for engagement, respectively, with a rotor body and a centering ring, each of said inboard and outboard ends having an annular locking key groove open in a radially inward direction, each locking key groove having a base representing a maximum depth of the groove, and a pair of side walls, said base including a pair of slots, each defined, respectively, by a pair of quarter circles connected by respective flat portions, wherein said slots are separated by an intermediate platform having a depth less than said maximum depth, and wherein said pair of quarter circles in each slot have different radii.

* * * * *